United States Patent
Lutz

(10) Patent No.: US 6,315,321 B1
(45) Date of Patent: Nov. 13, 2001

(54) GAS BAG MODULE FOR A VEHICLE OCCUPANT RESTRAINT SYSTEM

(75) Inventor: Joachim Lutz, Schechingen (DE)

(73) Assignee: TRW Occupant Restraint Systems GmbH & Co. KG, Alfdorf (DE)

(*) Notice: Subject to any disclaimer, the term of this patent is extended or adjusted under 35 U.S.C. 154(b) by 0 days.

(21) Appl. No.: 09/359,830

(22) Filed: Jul. 23, 1999

(30) Foreign Application Priority Data

Jul. 23, 1998 (DE) .......................................... 298 13 162 U

(51) Int. Cl.⁷ .................................................... B60R 21/16
(52) U.S. Cl. ......................................... 280/728.3; 280/732
(58) Field of Search ........................... 280/728.1, 728.2, 280/728.3, 732

(56) References Cited

U.S. PATENT DOCUMENTS

| | | | |
|---|---|---|---|
| 5,971,431 | * 10/1999 | Wohllebe et al. | 280/732 |
| 6,068,286 | * 5/2000 | Heilig | 280/728.3 |
| 6,126,195 | 10/2000 | Lutz . | |

FOREIGN PATENT DOCUMENTS

| | | |
|---|---|---|
| 44 42 543 | * 1/1996 | (DE) . |
| 197245954 | 1/1998 | (DE) . |
| 29721643 | 5/1998 | (DE) . |
| 19757437 | 7/1998 | (DE) . |

* cited by examiner

Primary Examiner—Paul N. Dickson
(74) Attorney, Agent, or Firm—Tarolli, Sundheim, Covell, Tummino & Szabo L.L.P.

(57) ABSTRACT

A gas bag module for a vehicle occupant restraint system comprises a module housing, a gas bag having a folded region, a gas generator, an unfolding opening via which the gas bag emerges in the case of restraint, a covering for the unfolding opening, and a flexible traction transfer device to expose the unfolding opening. The traction transfer device is connected with the covering. Further, the module comprises an intermediate wall provided between the folded region of the gas bag and the gas generator and connected with the traction transfer device. The intermediate wall is shifted by gas generated on activation of the gas generator in such a manner that the traction transfer device draws the covering away from the unfolding opening.

14 Claims, 5 Drawing Sheets

GAS BAG MODULE FOR A VEHICLE OCCUPANT RESTRAINT SYSTEM

TECHNICAL FIELD

The invention relates to a gas bag module for a vehicle occupant restraint system.

BACKGROUND OF THE INVENTION

A gas bag module known from DE 44 42 543 A1 comprises a flexible traction transfer means being connected with the gas bag. By the gas bag being filled, the traction transfer means is tightened, and the covering is drawn from the unfolding opening.

The unfolding process is disturbed by the connection of the traction transfer means with the gas bag, because the force for opening the covering additionally acts on the connection point. In addition, the gas bag fabric is stressed substantially much more at the connection point.

BRIEF SUMMARY OF THE INVENTION

The gas bag module according to the invention improves the unfolding process and reduces the material stress of the gas bag fabric.

The gas bag module according to the invention comprises a module housing, a gas bag having a folded region, a gas generator, an unfolding opening via which the gas bag emerges in the case of restraint, a covering for the unfolding opening, and a flexible traction transfer means to expose the unfolding opening. The traction transfer means is connected with the covering. Further, the module comprises an intermediate wall provided upstream of the folded region of the gas bag and downstream of the gas generator and connected with the traction transfer means. The intermediate wall is shifted by gas generated on activation of the gas generator in such a manner that the traction transfer means draws the covering away from the unfolding opening.

Through the fact that the force is not introduced into the traction transfer means via the gas bag but rather via the separate intermediate wall, firstly the unfolding of the gas bag is unimpeded and secondly the gas bag fabric is not exposed to any increased stress. The generated gas has a main flow direction within the module, e.g. from the gas generator immediately to the folded region of the gas bag, which is defined by the arrangement of the outflow openings in the gas generator housing and the parts limiting the gas flow and directing the gas flow towards the folded region. The terms "upstream" and "downstream" relate to the main flow direction. As in most cases the gas immediately flows from the gas generator to the folded region of the gas bag, the intermediate wall is arranged between the gas generator and the folded region of the gas bag.

By this arrangement, the high pressure generated by the complete gas mass flow at the beginning of the deflagration of the propellant is used for a fast displacement of the covering.

Preferably, the covering is opened by the traction transfer means before any inflow of gas into the gas bag. Ideally, gas can only flow into the gas bag when the covering is completely opened.

This ensures that the unfolding of the gas bag is not impeded by the covering, either.

In a preferred embodiment, the intermediate wall closes off the gas flow to the gas bag until the covering is opened. The intermediate wall therefore serves both for opening the covering and also for closing off the gas flow until the covering is opened.

According to a development, the intermediate wall is movable in the direction of the unfolding opening.

Likewise, it is also possible that the intermediate wall is arranged beneath the gas generator and is shifted contrary to the direction of the unfolding opening, i.e. away from it, by the gas generated on activation of the gas generator.

With an intermediate wall which is movable in the direction towards the unfolding opening, it is possible that the gas bag, in the folded state and before the inflow of gas into it, is pushed out through the unfolding opening by the intermediate wall movable in the direction of the unfolding opening. The unfolding process of the gas bag therefore is performed outside the unfolding opening and is therefore impeded neither by the covering nor by other parts of the gas bag module.

For the unfolding of the gas bag, it is favorable that the gas flows at the side of the intermediate wall into the gas bag when the intermediate wall is pushed out completely. Hereby, the radial unfolding of the gas bag is assisted.

The intermediate wall is advantageously mounted only at the flexible traction transfer means and is able to move in the direction towards its initial position, i.e. back into or deeper into the module again after the gas bag is filled. Thereby, the intermediate wall does not represent any risk of injury to the vehicle occupant striking onto the gas bag.

In the preferred embodiment, in which the intermediate wall moves in the direction towards the unfolding opening, a deflection is provided for the traction transfer means, by which the traction transfer means draws the covering away from the unfolding opening contrary to the unfolding direction. The deflection for the traction transfer means is preferably arranged on the housing of the gas bag module, but it can also take place on a vehicle part.

With the integration of a gas bag module into a vehicle, the requirement always exists of keeping the occupied space as small as possible. Furthermore, on opening the covering, care is to be taken that this does not project into the passenger area in the opened state, representing a potential danger.

In order to meet these two requirements, it is very favorable that the covering is tilted by the traction transfer means around the upper edge of the module housing and at the same time is shifted contrary to the unfolding direction of the gas bag.

Advantageously the covering has two parts, so that the withdrawal of the covering takes place twice as quickly as with a one-piece covering.

Firstly, it is desired that the covering is shifted and withdrawn as quickly as possible, and secondly for a quick unfolding of the gas bag it is necessary to push the folded region of the gas bag as far outwards as possible, because hereby a greater through-flow opening for filling the gas bag is produced between the intermediate wall and the upper edge of the module housing.

With the first displacement of the intermediate wall, the withdrawal of the covering starts immediately. In order to be able to push the folded region of the gas bag still further outwards when the covering is already completely withdrawn, means are preferably provided on the traction transfer means which extend the traction transfer means when the covering is completely withdrawn.

In an alternative embodiment, the through-flow openings are only exposed through the extending of the traction transfer means. This can be effected for example by the intermediate wall emerging from the unfolding opening only by the extending of the traction transfer means.

In another variant, the flexible traction transfer means is constructed as a tubular cloth or as a strap which forms a duct from the gas generator to the intermediate wall. The through-flow openings in the cloth are only exposed by the extending of the cloth.

The means for extending the traction transfer means are preferably constructed as folds of the traction transfer means, the portions of which are sewn by means of a tear seam with a predetermined breaking load.

DETAILED DESCRIPTION OF A PREFERRED EMBODIMENT

Figure 1:
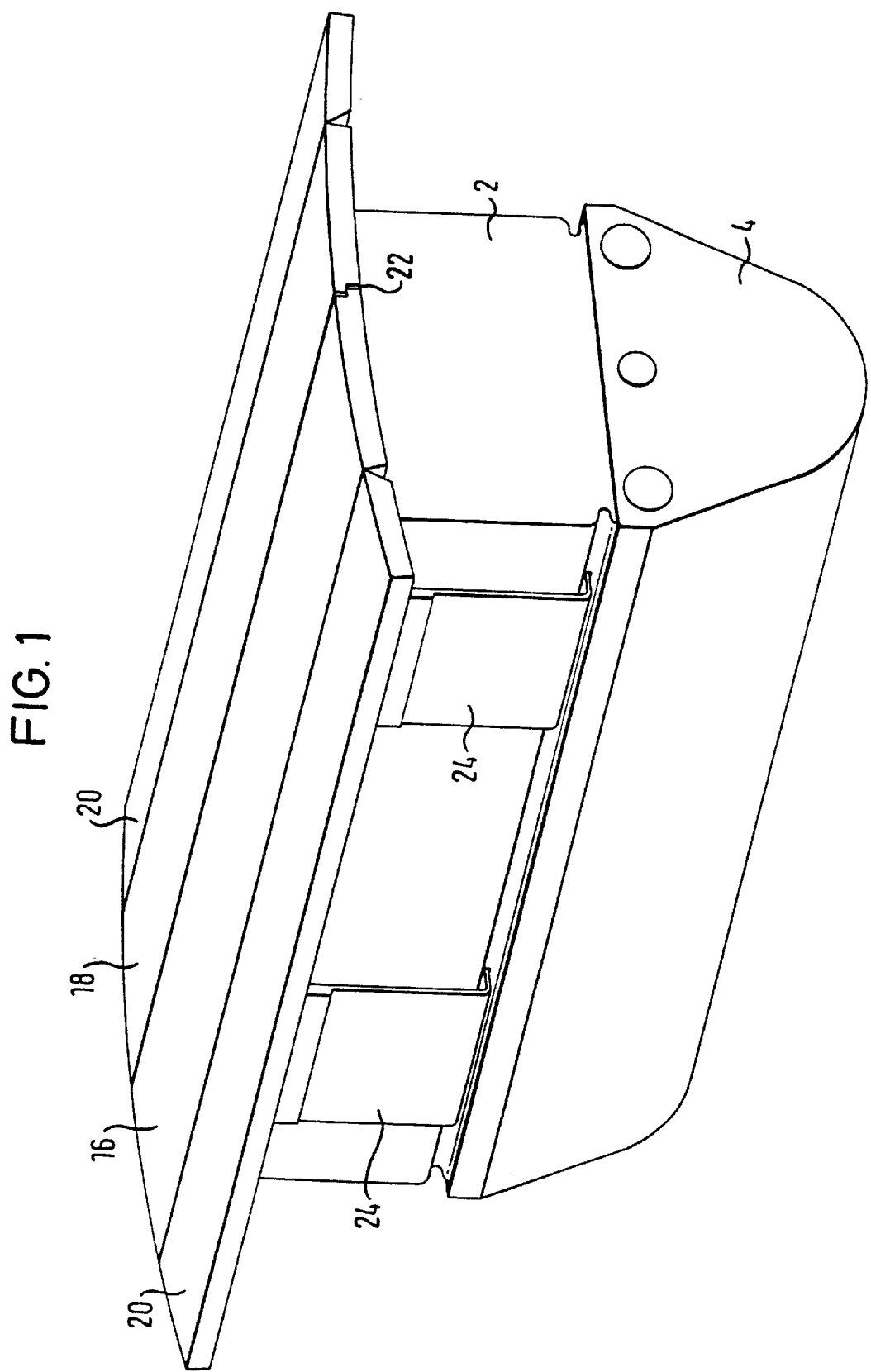
FIG. 1 shows an oblique view of the gas bag module according to the invention.
Figure 2:
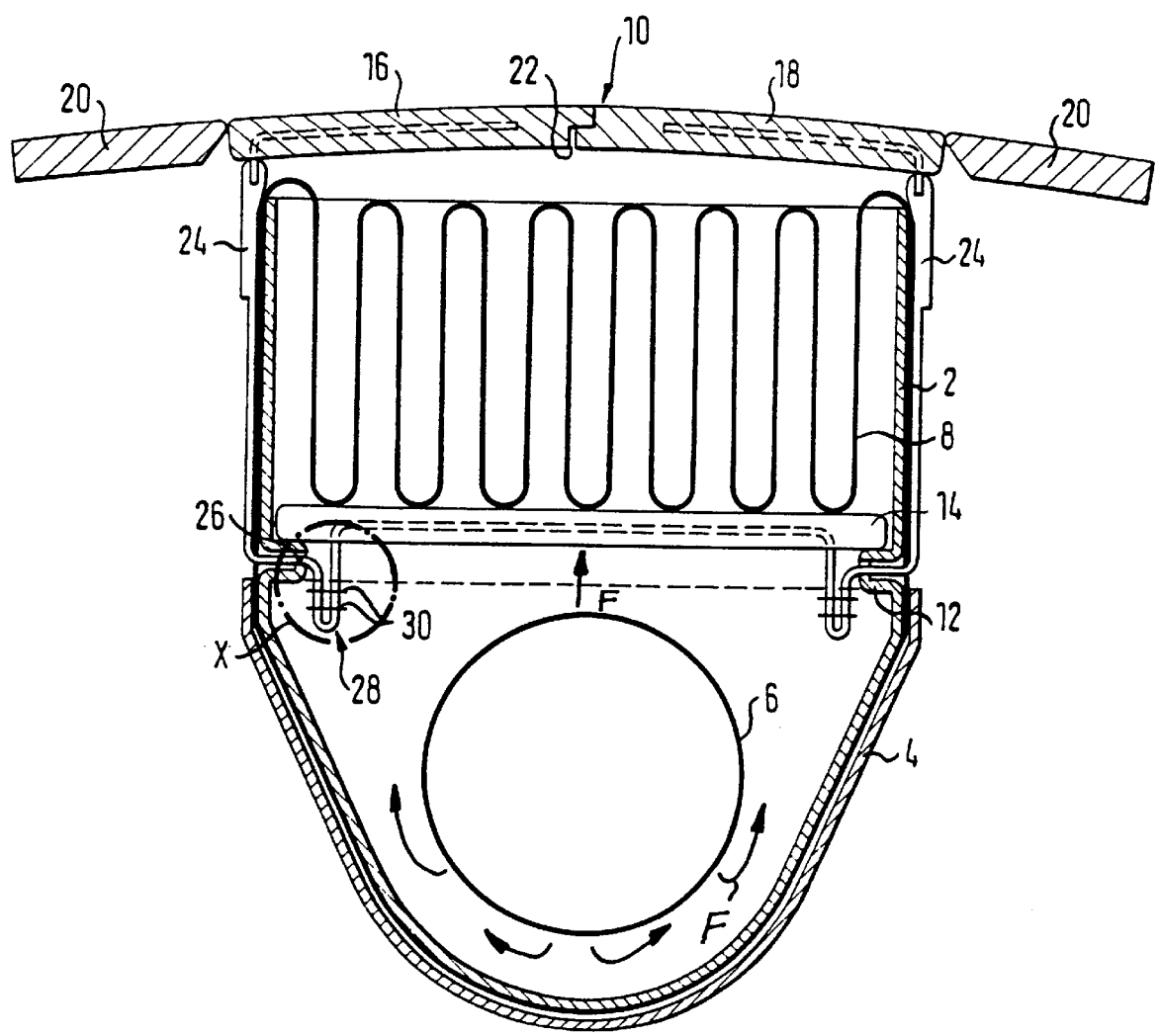
FIG. 2 shows a cross-section through the gas bag module with the covering closed.

The construction of the gas bag module is described with the aid of FIGS. 1 and 2.

The gas bag module consists of a module housing 2, which is surrounded in the lower half by an outer housing 4. In the lower part of the module housing 2 a gas generator 6 is accommodated, which releases the gas in the case of restraint. A gas bag 8 surrounds the module housing 2 and is secured between the outer housing 4 and the module housing 2. The module housing 2 is provided on the upper side with an unfolding opening 10.

Shortly above the outer housing 4, the module housing 2 has a U-shaped bulge 12 projecting inwards, on which an intermediate wall 14 in the form of a plate rests. The folded region of the gas bag 8 is arranged on the intermediate wall 14, which extends downstream of the gas generator an upstream of the folded region of the gas bag with respect to the main flow direction of the gas (see arrows F in FIG. 2), i.e. between the intermediate wall 14 and the inner side of a covering 16, 18. The intermediate wall 14 is decoupled from the gas bag 8 and is arranged in terms of flow between the gas generator 6 and the folded region of the gas bag 8. In other words, it is arranged in front of, i.e. upstream of the folded region of the gas bag, related to the gas flow which is directed in the direction towards the covering 16, 18 on activation of the gas generator.

The unfolding opening 10 is closed on the upper side of the module housing 2 by a covering 16, 18, which is formed by two rectangular covering halves 16 and 18. The covering halves 16, 18 are placed into a surrounding paneling 20 which generally represents the vehicle instrument paneling. The covering halves 16, 18 are placed together by means of a step-shaped joint 22.

Each of the covering halves 16, 18 is connected with the intermediate wall 14 by means of two flexible traction transfer means 24. The flexible traction transfer means 24 are constructed in the form of a flexible strap, the ends of which are each fastened to one covering half 16, 18. Each of the traction transfer means 24 extends, starting from each end along the outside of the module housing 2 up to the U-shaped bulge 12, in which a slit 26 is provided, through which the traction transfer means 24 extends to the intermediate wall 14, where it is arrested on the intermediate wall 14. The traction transfer means 24 likewise extends through the gas bag 8, which has a slit in the region of the bulge 12.

In an embodiment which is not illustrated, the gas bag 8 is connected with the module housing 2 above the slit 26, so that the slit in the gas bag 8 is not required to pass the traction transfer means 24 through.

Figure 3:
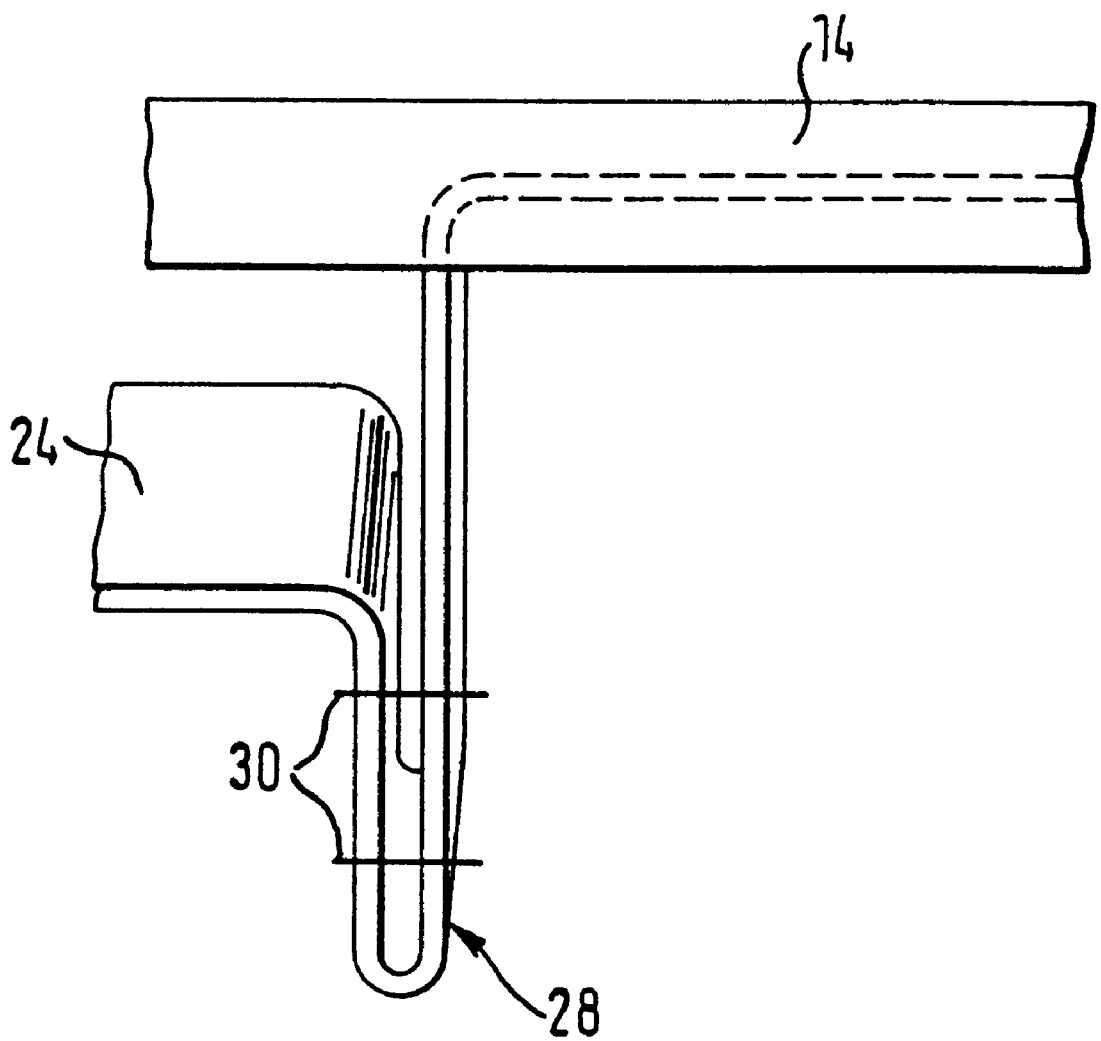
FIG. 3 shows the detail X from FIG. 2 on an enlarged scale and in oblique view.

A fold 28 is provided in the traction transfer means 24 between the slit 26 and the intermediate wall 14, the folded portions of the traction transfer means 24 being sewn with a tear seam 30 with a predetermined fraction load. The fold 28 of the traction transfer means 24 is illustrated on a larger scale in FIG. 3.

Figure 4:
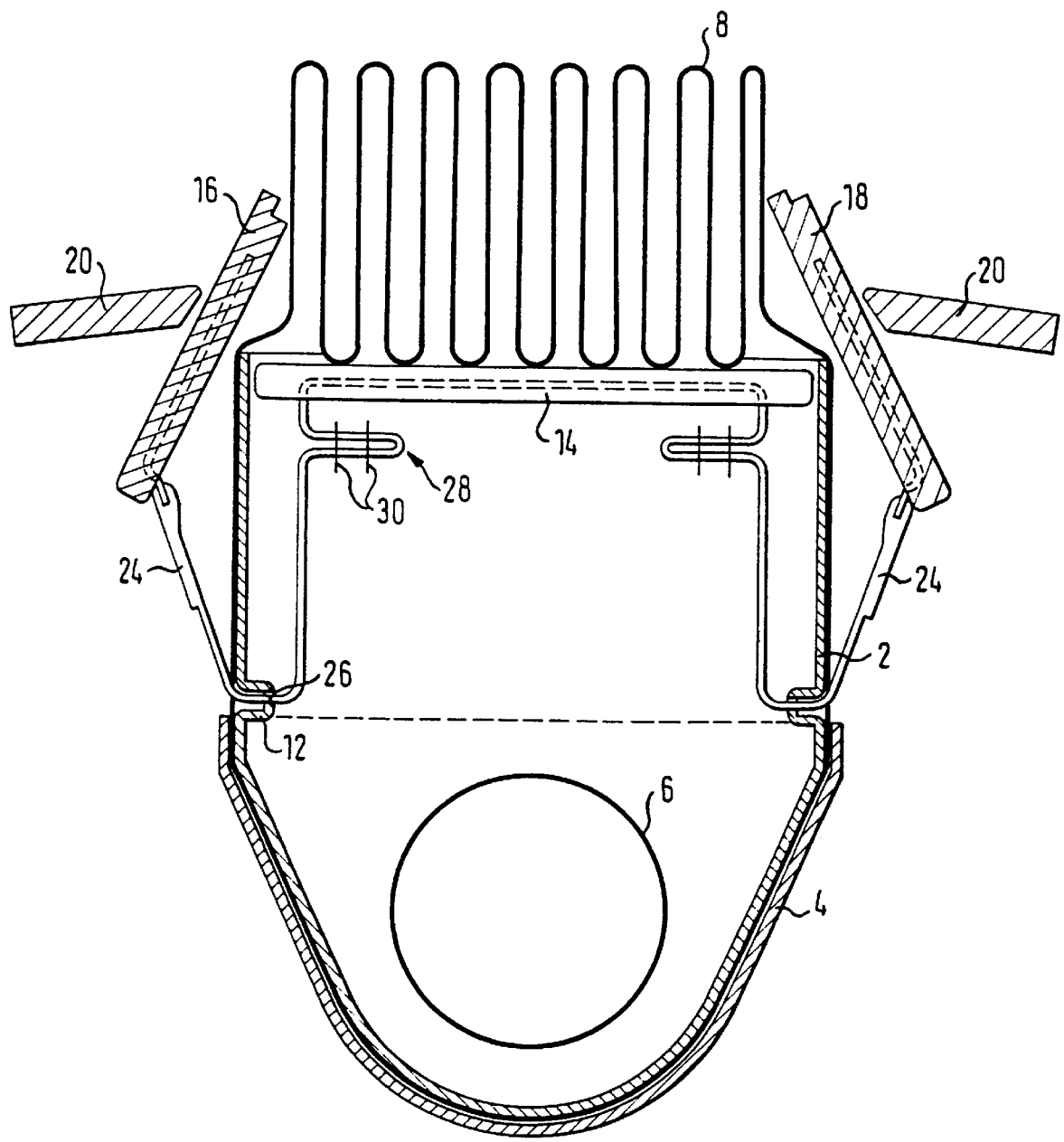
FIG. 4 shows the view from FIG. 2 during the opening movement and FIG. 5 likewise shows the view from FIG. 2 with the gas bag module in completely opened state.

FIG. 4 shows the view from FIG. 2 whilst the covering halves 16, 18 are being opened. After the igniting of the gas generator 6, an excess pressure is generated in the lower part of the module housing 2, and the intermediate wall 14 with the folded gas bag 8 lying thereon is pushed upwards against the covering halves 16, 18. At the same time, the covering halves 16, 18 are drawn downwards by the traction transfer means 24 at the edges pointing towards the paneling 20. The slit 26 in the module housing 2 forms here the deflection for the traction transfer means 24. The covering halves tilt substantially about the upper edge of the module housing 2 and are drawn downwards outside the module housing 2 and beneath the paneling 20 at the same time.

At the same time, the folded region of the gas bag 8 is pushed out from the gas bag module through the unfolding opening 10 by the intermediate wall 14.

Figure 5:
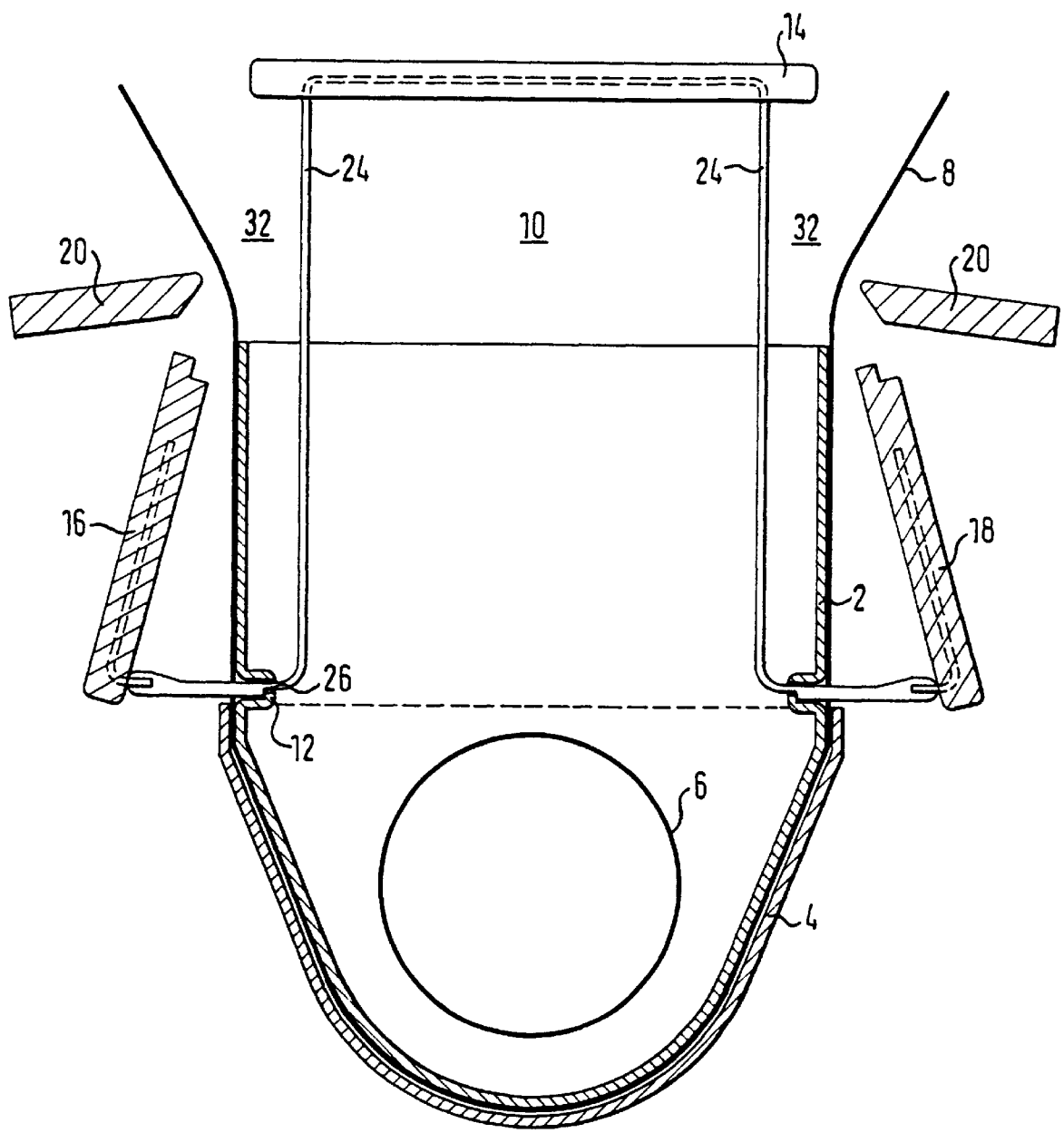

After the covering halves 16, 18 have reached their final position, the intermediate wall 14 can move further out from the gas bag module by the breaking of the tear seam 30 (FIG. 5).

As soon as the intermediate wall 14 emerges over the upper edge of the module housing, a through-flow opening 32 (see FIG. 5) is developing between the underside of the intermediate wall 14 and the upper edge of the module housing 2, via which the gas arrives into the gas bag 8. The intermediate wall 14 serves to close off gas, to deflect gas in horizontal direction, and it assists the unfolding process of the gas bag by pushing out the gas bag.

In FIG. 5 the intermediate wall 14 is already fully extended and the covering halves 16, 18 are fully withdrawn.

In an embodiment which is not illustrated, the through-flow openings 32 are already exposed before the extension of the traction transfer means 24.

What is claimed is:

1. A gas bag module for a vehicle occupant restraint system, comprising:

a module housing, a gas bag having a folded region, a gas generator, an unfolded opening via which said gas bag emerges in the case of restraint, a covering for said unfolded opening, a flexible traction transfer means to expose said unfolding opening, which is connected with said covering, and an intermediate wall provided upstream of said folded region of said gas bag and downstream of said gas generator and immediately connected with said traction transfer means, said intermediate wall being shifted by gas generated on activation of said gas generator to draw said covering away from said unfolded opening by said traction transfer means.

2. The gas bag module according to claim 1, wherein said covering, said intermediate wall and said traction transfer means are of such a design that said traction transfer means opens said covering before any inflow of gas into the gas bag.

3. The gas bag module according to claim 1, wherein said covering, said intermediate wall and said traction transfer means are of such a design that gas can only flow into said gas bag when said covering is completely opened.

4. The gas bag module according to claim 1, wherein said covering, said intermediate wall and said traction transfer means are of such a design that said intermediate wall closes off gas flow to said gas bag until said covering is opened.

5. The gas bag module according to claim 1, wherein said intermediate wall is arranged in the module to be movable in the direction towards said unfolded opening.

6. The gas bag module according to claim 1, wherein said gas bag, said intermediate wall and said gas generator are arranged that said gas flows at the side of said intermediate wall into said gas bag when said intermediate wall is pushed out of the module.

7. The gas bag module according to claim 1, wherein said gas bag, in its folded state and before inflow of gas into it, is pushed out through said unfolded opening by said intermediate wall movable in the direction towards said unfolded opening.

8. The gas bag module according to claim 1, wherein said intermediate wall is movable into said gas bag module when said gas bag is fully unfolded.

9. The gas bag module according to claim 1, wherein a deflection is provided for said traction transfer means, by which said traction transfer means draws said covering away from said unfolded opening contrary to the unfolding direction of said gas bag.

10. The gas bag module according to claim 1, wherein said covering is tilted by said traction transfer means substantially around an upper edge of said module housing and at the same time is shifted contrary to the unfolding direction of said gas bag.

11. The gas bag module according to claim 1, wherein said covering consists of two covering halves.

12. The gas bag module according to claim 1, wherein means are provided on said traction transfer means which extend said traction transfer means when said covering is shifted completely to expose said unfolded opening, and which push said intermediate wall with said folded region of said gas bag still further outwards.

13. The gas bag module according to claim 12, wherein said means for extending said traction transfer means are constructed as folds of said traction transfer means, portions of said folds being connected with each other up to a predetermined breaking load.

14. The gas bag module according to claim 12, wherein by extending of said traction transfer means through-flow openings are exposed, which open into said gas bag.

* * * * *

UNITED STATES PATENT AND TRADEMARK OFFICE
CERTIFICATE OF CORRECTION

PATENT NO. : 6,315,321 B1
DATED : November 13, 2001
INVENTOR(S) : Joachim Lutz

It is certified that error appears in the above-identified patent and that said Letters Patent is hereby corrected as shown below:

Column 5,
Lines 4, 21, 29 and 30, change "unfolded" to -- unfolding --.

Column 6,
Lines 7 and 19, change "unfolded" to -- unfolding --.

Signed and Sealed this

Eleventh Day of June, 2002

*Attest:*

*Attesting Officer*

JAMES E. ROGAN
*Director of the United States Patent and Trademark Office*